Aug. 16, 1966 J. MORGAN 3,266,457
INDICATING INSTRUMENT
Filed Jan. 25, 1961 2 Sheets-Sheet 1
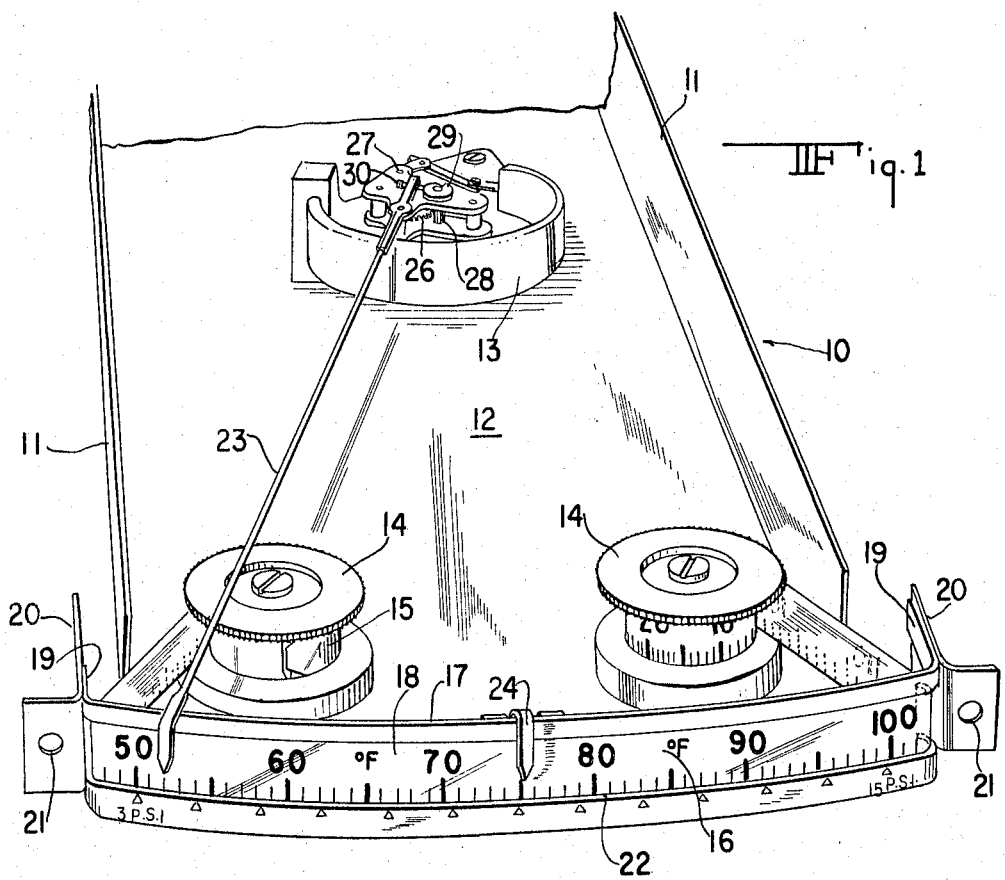
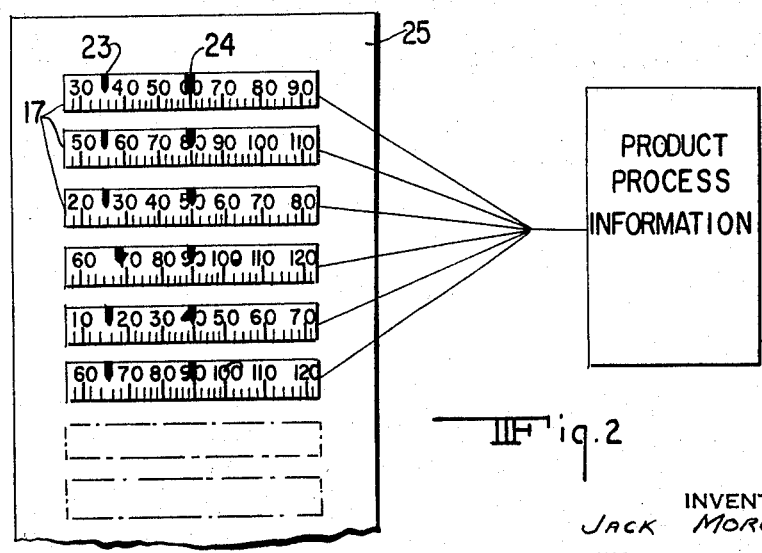
INVENTOR
JACK MORGAN
BY
Robertson and Smythe
ATTORNEYS Aug. 16, 1966  J. MORGAN  3,266,457
INDICATING INSTRUMENT Filed Jan. 25, 1961  2 Sheets-Sheet 2

INVENTOR
JACK MORGAN
BY
Robertson and Smythe
ATTORNEYS

United States Patent Office 3,266,457
Patented August 16, 1966

1

3,266,457
INDICATING INSTRUMENT
Jack Morgan, Willow Grove, Pa., assignor to
Ametek, Inc., a corporation of Delaware
Filed Jan. 25, 1961, Ser. No. 84,936
1 Claim. (Cl. 116—129)

This invention relates to indicating instruments for measuring conditions of variables and a means for readily determining at a glance whether such conditions are as desired.

One of the objects of the present invention is to obviate the heretofore rather cumbersome manner of independently checking a plurality of readings on condition measuring instruments that may either be provided with independent indicia or located at independent positions, or both, the elimination of which will enable the ascertaining whether desired conditions are prevalent with a comparative substantial reduction of time consumption.

In one aspect of the invention, indicating means is provided for one or more instruments each having independent condition responsive means. Each instrument embodies a pair of rotatably mounted spools, to each of which is secured end portions of an indicia tape. Upon rotation of each pair of spools, the tape is adjusted to a predetermined position to present a desired range portion thereof between the spools. A pointer connected to each condition responsive means is movable along the range portion to indicate a reading of a condition being measured.

Other objects, advantages and features of the invention will become apparent from the following description and drawings, which are merely exemplary.

In the drawings:

FIG. 1 is a broken perspective view of a portion of an indicating instrument employing the present invention;

FIG. 2 is a front elevational view, partially broken away, showing viewing sections of a plurality of indicating instruments mounted on a common support;

Figure 3:
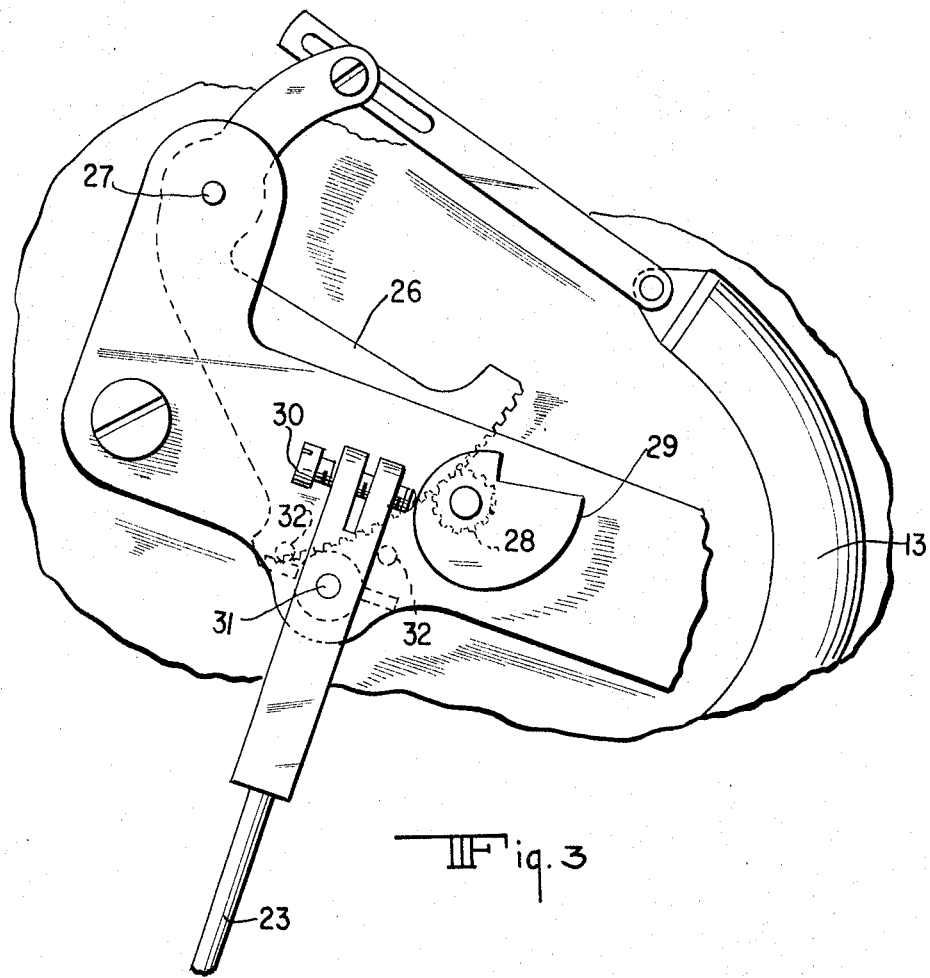
FIG. 3 is a fragmentary top plan view of the Bourdon tube shown in FIG. 1.

Referring to FIG. 1, an internal U-shaped support member 10 having side walls 11 tnd a bottom wall 12 may be suitably secured within an instrument housing. The bottom 12 suitably supports a Bourbon tube 13 or other condition responsive means.

Preferably, a pair of spools 14 which are rotatably mounted on the bottom 12 and adapted to have secured thereto end portions 15 of a condition indicia tape 16. The tape preferably has a plurality of scaled graduations to indicate desired measurements in temperature, pressure, etc. A predominantly arcuate-shaped viewing section or support 17 for slidably receiving an intermediate portion 18 of the tape is preferably positioned at the front of the instrument. The viewing section 17 is suitably secured by its inwardly bent ends 19 to brackets 20. The brackets may be apertured as at 21 for mounting to or within the instrument housing.

The viewing section 17 preferably is formed with a recessed channel 22 in which the tape 16 may be positioned. Suitable slots or passages may be provided adjacent the ends of the channel or the back wall of the channel may terminate sufficiently short of the brackets 20 to permit passage of the tape rearwardly for winding on the spools.

Thus, one of the spools may be rotated to wind the tape thereupon, while correspondingly unwinding the tape from the other spool, so as to slidingly adjust said tape relative to the viewing section for presenting a predetermined range portion of the tape in the viewing section.

An indicating pointer 23, connected to the bourdon tube or condition responsive means, extends to the viewing section and its pointed tip is bent down thereover and adapted to move along and in front of the range portion of the condition indicia tape in said viewing section to indicate the measured condition.

A reference pointer or spring clip 24 may be adjustably positioned at or near the center of the viewing section or support 17.

FIG. 2 discloses a plurality of viewing sections of vertically aligned indicating instruments mounted on a common support 25. Each of the tapes is adjusted to present within the respective viewing sections a predetermined range portion for each instrument. Preferably, the reference pointers 24 are set at corresponding desired readings or conditions, so that alignments therewith of the respective condition indicating pointers 23 will readily reflect desired readings and that any deviations or misalignments will reflect undesired readings or conditions. The tape range portions may be adjusted such that the reference pointers 24, set at desired readings, will be in vertical alignment and thereby facilitate a determination whether or not the measured conditions are as desired.

Figure 4:
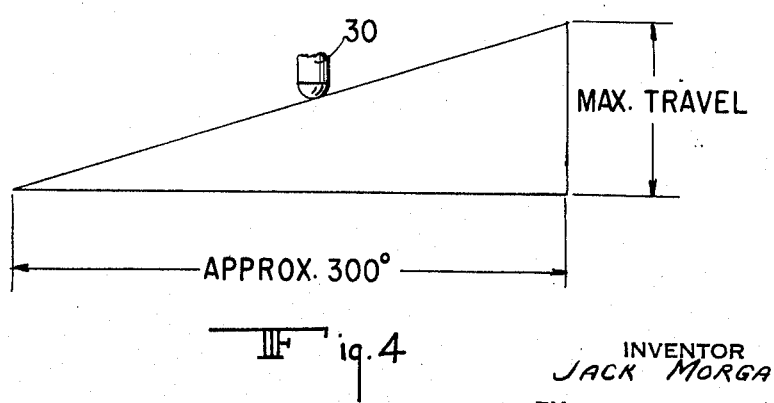
FIG. 4 is a graphical representation of action by the cam of the Bourdon tube upon the cam follower of the indicating pointer.

Changes in the condition responsive means or Bourdon tube 13 (FIG. 3) will cause rotation of the sector gear 26 about its pivot 27 to rotate or drive gear 28 and cam 29 which are fixed on a common shaft. Adjustment screw 30, which serves to set the indicating pointer at a correct reading on the tape 16, also acts as a cam follower to rotate the pointer 23 about pivot 31 to reflect the changes or readings of the condition being measured. The effect of the camming surface of rotating cam 29 upon the screw 30 is illustrated in FIG. 4. Stop means 32 may be employed on either side of the pointer 23 to limit the movement thereof within a desired range.

It is to be understood that the foregoing description is merely intended for the purpose of illustration, and that the principles of the invention are not intended to be limited thereto, except as defined in the appended claim.

What is claimed is:

An indicating instrument having a viewing section and a condition responsive means, comprising a flat support member with a bourdon tube condition responsive means disposed adjacent one end thereof, an indicating pointer operatively connected to said tube responsive means and extending across said support member toward its opposite end, an arcuate viewing section angularly disposed relative to said support member, said section having a recessed channel therein for receiving a graduated tape therein, said viewing section having slots adjacent its opposite ends for passing the ends of said tape therethrough, two spaced adjustable rotatable spools disposed on said support member adjacent said opposite end forming a triangular configuration with said tube responsive means, a graduated indicia tape carried by said spools and having its opposite ends threaded through said slots with its central portion extending along said recessed channel, a reference pointer mounted on said viewing section to point to predetermined graduations on said tape said indicating pointer extending parallel to said support member in a direction toward said opposite end and having a bent portion disposed on front of and contiguous to the graduated face of said tape to indicate a condition with respect to said tape, and relative to said reference pointer.

(References on following page)

References Cited by the Examiner

UNITED STATES PATENTS

| | | | |
|---|---|---|---|
| 1,544,426 | 6/1925 | Blum | 84—483 |
| 2,090,160 | 8/1937 | Spitzglass et al. | 116—129 |
| 2,096,669 | 10/1937 | Burgard | 33—138 X |
| 2,464,190 | 3/1949 | Wen | 73—431 |
| 2,924,499 | 2/1960 | Young et al. | 116—129 X |
| 2,942,927 | 6/1960 | Keyser | 116—135 X |
| 2,945,120 | 7/1960 | Green et al. | 116—129 X |

FOREIGN PATENTS 543,117 8/1931 Germany.
14,457 A.D. 1886 Great Britain.

LOUIS J. CAPOZI, *Primary Examiner.*

C. W. ROBINSON, LEO SMILOW, *Examiners.*

CHARLES M. OVERBEY, *Assistant Examiner.*